Nov. 28, 1939.  J. O. DUNCAN  2,181,178
TRAILER HITCH
Filed July 25, 1938

INVENTOR
J. O. Duncan
BY
ATTORNEY

Patented Nov. 28, 1939

2,181,178

UNITED STATES PATENT OFFICE 2,181,178

TRAILER HITCH

John O. Duncan, Fresno, Calif., assignor of one-half to Charles C. Liest, Fresno, Calif.

Application July 25, 1938, Serial No. 221,075

2 Claims. (Cl. 280—33.17)

This invention relates in general to a hitch or coupler for use between a motor vehicle and a trailer; the invention being specifically directed to, and it is my principal object to provide, a trailer hitch—of the ball and socket type—which is so constructed that it may be readily and quickly coupled or uncoupled and yet when coupled is positively locked against accidental separation of the male and female portions thereof.

Additional objects of the invention are to provide a novel locking arrangement for the hitch, and to provide an included spring element in the hitch which not only serves as a shock absorber but also maintains proper engagement of the members of the socket unit with the ball so that wear is taken up as it occurs.

A further object of the invention is to produce a simple, quiet, free and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
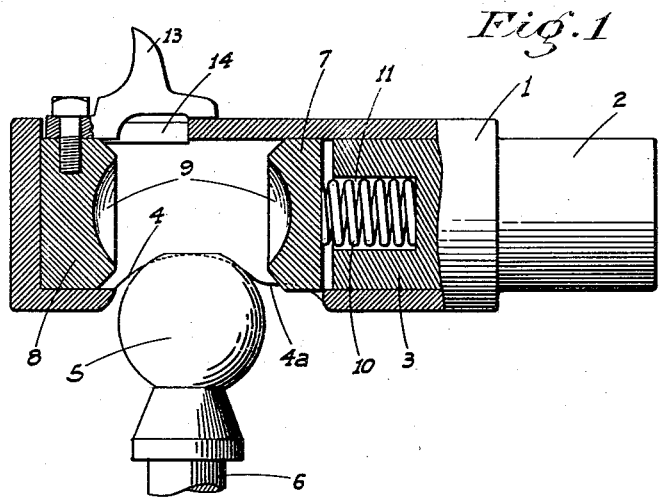
Figure 1 is a sectional elevation of the hitch with the socket unit and ball separated.

Referring now more particularly to the characters of reference on the drawing, the hitch comprises a hollow cylindrical body 1 which is closed at both ends and provided at one end with an axially projecting stem or shank 2 adapted for connection with the forward end of a trailer tongue in any suitable manner. For convenience of manufacture, the stem end of the body preferably is initially open and the stem comprises a solid metallic cylinder which projects some distance, as at 3, into said open end. The body and metallic cylinder are secured together in fixed relation as by pressing or welding.

On one side the body is formed with a longitudinal slot 4 of sufficient length and arcuate extent to permit the ball 5 of the hitch assembly to pass therethrough into said body. The ball 5 includes the usual neck 6 adapted for connection with the motor vehicle.

A pair of complemental circular socket heads 7 and 8 are slidably disposed in the cylindrical body 1; the adjacent faces of these heads being formed with concave faces 9 whose radius is that of ball 5. The head 7 is disposed in the body adjacent but spaced from the inner end of cylinder portion 3, there being a heavy duty compression spring 10 seated in an axial bore 11 and engaging the adjacent face of said head 7. To prevent escape of head 7 laterally through slot 4, the adjacent portion of said slot is reduced in arcuate extent, as at 4a, to less than the diameter of the head.

Figure 2:
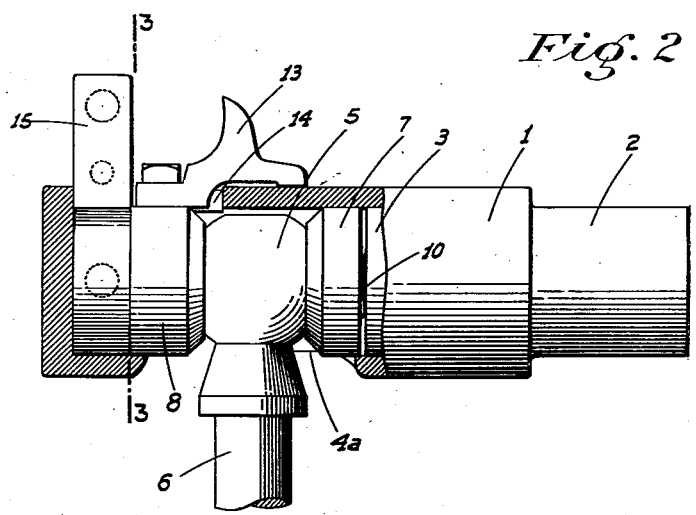
Figure 2 is a side elevation, partly broken away, of the device in operative position.
Figure 3:
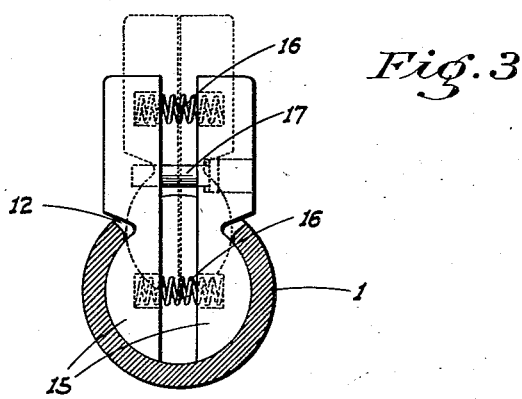
Figure 3 is a cross section on line 3—3 of Fig. 2.

The other socket head 8 is disposed in the body in spaced relation from head 7 and the body is constructed so that when head 8 is moved into engagement with the adjacent end of the body, sufficient clearance is provided between the heads for the insertion of ball 5 through the slot 4 into the body. After the ball is so inserted, it is securely but releasably held in operative position between heads 7 and 8, as shown in Fig. 2, in the following manner:

A circumferential slot 12 is cut in the body on the side opposite slot 4; slot 12 being of the same width as and radially alined with the space between head 8 and adjacent closed end of the body when ball 5 is engaged between the heads as shown in Fig. 2. Head 8 is moved into such position from its retracted position, as shown in Fig. 1, by means of a projecting trigger 13 which extends through a longitudinal slot 14 which opens at one end into slot 12.

The head 8 is held in operative position by means of a locking key which is inserted through slot 12 and prevents retraction of head 8. The thickness of the key is substantially the width of slot 12, and such key comprises a normally spaced pair of elements 15 held in such spaced relation by compression springs 16, and guided by a cross pin 17. At one end portion, the outer edges of elements 15 are formed with a curve the radius of which is the same as that of the interior of the body so as to closely engage the same. The slot 12 is of less arcuate extent than the diameter of the interior of the body so that the curved portions of elements 15 of the key must be contracted before the key can be inserted or removed from the body. The other end portions of the elements 15 project from the body when the key is in place and serve as handles by means of which said aforementioned contraction can be accomplished.

In use, the hitch is coupled or uncoupled as indicated and when coupled, the key positively prevents accidental separation of the socket unit from the ball. Further, the spring 10 not only serves as a shock absorber but also maintains a certain pressure of the head 7 against the ball as is desirable to assure quiet operation without undue binding which might otherwise occur, while eliminating any loose play.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a ball and socket trailer hitch, a socket unit comprising a hollow body having an opening in one side to permit entry of the ball, a pair of complemental socket heads disposed in the body in spaced relation, said heads having concave adjacent faces adapted to engage the ball, one of said heads being mounted for sliding movement to and from a ball engaging position, a slot cut through the body in a plane at and beyond the back of said one head, and a key adapted for insertion through said slot when said one head is in a ball engaging position to then prevent retraction of said head, the body being cylindrical and the arcuate extent of the slot being less than the interior diameter of the body, said key comprising a pair of normally spaced parallel elements, means mounting said elements together for guided contracting movement and spring means between the elements to resist such movement; the elements at one end portion being formed with outer edges curved on substantially the same radius as the interior of the body.

2. In a ball and socket trailer hitch, a socket unit comprising a hollow and cylindrical body closed at its ends, said body having an opening in one side to permit entry of the ball into the body, a pair of socket heads slidably disposed in the body in spaced relation, adjacent faces of the heads being concave and adapted to engage the ball, a trigger mounted on and extending radially from one head, the body having a longitudinal slot through which the trigger projects, whereby said trigger may be manipulated to move said head to and from a ball engaging position, a locking key, the body having another slot cut therethrough to receive the key, the key when inserted therein blocking said one head against retraction from a ball engaging position, means in the body to limit retractive movement of the other head, and a compression spring engaging said other head and resisting such movement.

JOHN O. DUNCAN.